March 21, 1950  B. HYBLER  2,501,222
ALTERNATING CURRENT GENERATOR
Filed May 3, 1946  2 Sheets-Sheet 1

INVENTOR
Břetislav Hybler
By Watson, Cole, Grindle & Watson
ATTYS

March 21, 1950   B. HYBLER   2,501,222
ALTERNATING CURRENT GENERATOR
Filed May 3, 1946   2 Sheets-Sheet 2
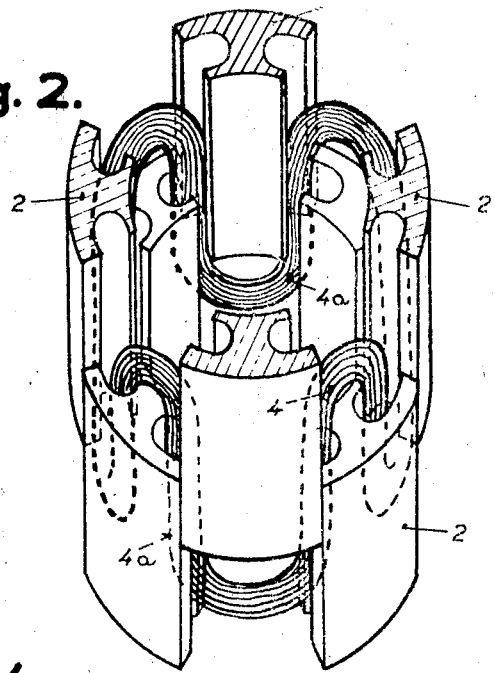
Fig. 2.
Fig. 4.
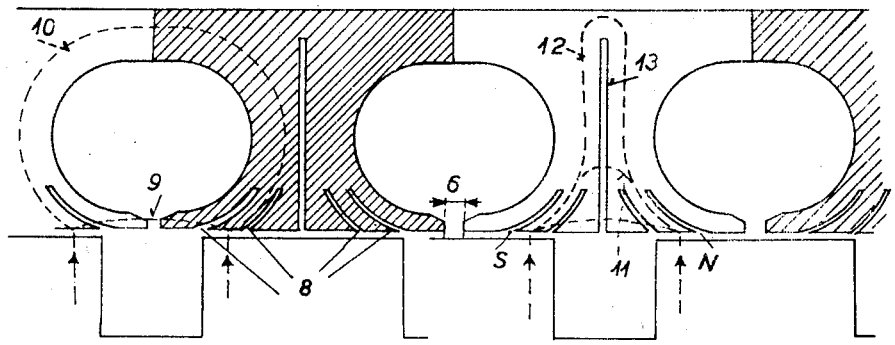
INVENTOR
Břetislav Hybler
By Watson, Cole, Grindle & Watson
ATTYS

UNITED STATES PATENT OFFICE

2,501,222

ALTERNATING CURRENT GENERATOR

Bretislav Hybler, Hubalov, Czechoslovakia

Application May 3, 1946, Serial No. 666,890
In Czechoslovakia September 24, 1945

5 Claims. (Cl. 171—252)

Various constructions of small single phase generators are known for producing current for small lighting plants, in particular for cycles. The design of such generators has mainly been suited to the requirements of cheapness and consequently leaves much to be desired from the electrical viewpoint. Cheapness is achieved, in these known constructions, by giving the winding the form of an annular coil which is easy to wind, and the magnetic flux is led into the coil from a permanent magnet via an unlaminated iron core, whereas it is desirable to laminate the core, in order to avoid eddy currents, the laminations extending perpendicular to the direction of the induced current and parallel to the direction of the magnetic flux. A further loss occurs through induction in the permanent magnet itself due to the variations in magnetic flux which arise from the change in magnetic resistance occurring as the pole of the permanent magnet passes from beneath the stator pole to beneath the stator groove which carries the winding. As such dynamoelectric machines are operated at a frequency much above the normal frequencies, the eddy current losses are especially large.

The object of the present invention is to reduce these losses as far as possible and at the same time provide a simple and inexpensive construction. The construction according to the invention consists in forming the stator of a number of equally sized unattached segments of section approximating to that of a sector of a circle, which segments are assembled closely together in the generator housing to form a coherent arch and form between each pair of segments a winding groove parallel to the rotor axis. The contacting surfaces of these segments lie in planes which pass through the rotor axis and the centre of the winding groove. This configuration of the stator segments makes it possible to make them of laminations, the planes of which lie at right angles to the induced current and in the plane of the magnetic flux. The production of eddy currents in the stator is therefore impeded. The formation of eddy currents in the rotor is avoided on the one hand by suitable configuration of the segments and on the other hand by appropriate shaping of the rotor poles, both as later described.

An example of construction of the invention is shown in the drawings in Figures 1 to 4.

Figure 2 is a perspective view illustrating the manner of assembling the winding with the stator segments;

Figure 4 is a development of the stator periphery.

Figure 1:
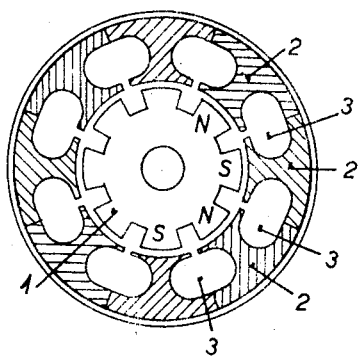
Figure 1 is a cross-sectional view of a dynamoelectric machine according to the present invention.

Figure 1 is a section through the dynamoelectric machine at right angles to the axis of rotation of the magnet. The magnet has eight poles alternately designated by N, S. The stator is of laminated construction, the laminations lying in the plane of Figure 1 at right angles to the axis of the machine and therefore in the direction of the magnetic flux and at right angles to the induced currents. The stator is divided in the plane of Figure 1 into segments 2 corresponding in number to the magnet poles. These segments abut closely together and each has formed in it a half groove, so that each pair of adjoining segments forms between them a groove 3 parallel to the axis for the reception of the winding.

Figure 3:
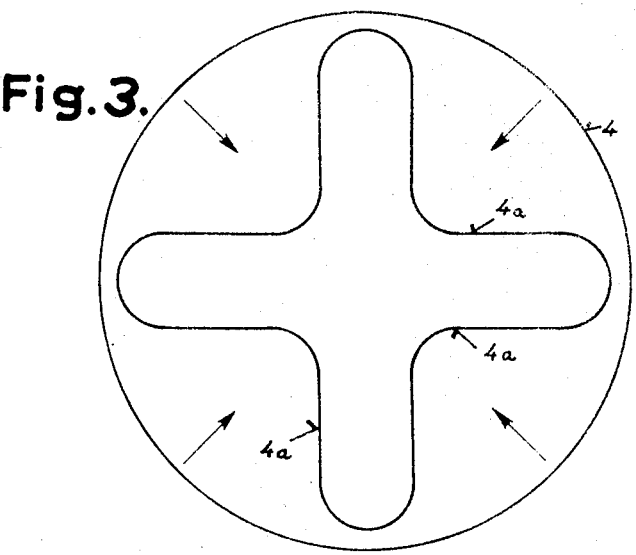
Figure 3 is a diagrammatic representation of the winding prior to its insertion into the grooves between stator segments.

The invention also contemplates a simplification in the arrangement of the winding. According to the invention the winding consists of a single closed induction coil which is introduced in sinuous fashion through the grooves formed in the stator segments so that the direction of the winding alternates in adjoining grooves. The winding is wound in the form of an annular coil as indicated diagrammatically by the line 4 in Fig. 3, having a desired number of turns, and a peripheral length which is equal to the depth 7 of the segments 2 plus the end length, the whole multiplied by seven. The coil is then pressed in, as indicated by the arrows, to the star formation, and its ends are bent over to lie parallel to the rotor axis so that a closed zigzag defining the surface of a cylinder results, the parts 4a constituting the surface straight portions thereof. The stator segments 2 can readily be assembled around the coil of this construction as is shown in Figure 2, the parts 4a occupying the grooves 3. All of the segments can be introduced simultaneously into the machine housing whereby they assume an arched form and constitute together a coherent whole. For this reason it is unnecessary to secure these segments in any way.

By the above-mentioned construction of the stator the eddy current losses in it are reduced to a minimum. To avoid similar loss in the rotating magnet, the stator laminations are, according to the invention, given a suitable form.

In order to reduce to zero eddy current losses in the magnet the ideal case must occur, namely that in which the stator ring has no air gap at all in its inner periphery. By the construction according to the invention this is rendered possible to reduce to a minimum the air gap 6 between adjacent stator poles. As it is not necessary to introduce the winding into grooves through these gaps 6, but on the contrary if possible after separating the segments to introduce the winding as a unit into the grooves, the gaps 6 can be made very small. A lower limit is however imposed on its size by the fact that the gap must constitute a definite magnetic resistance. The invention proposes a yet further narrowing of the gaps 6. To this end the segments are provided in their lower parts with small air gaps 8 which are at right angles to the laminations and follow the lines of force. The lines of force are therefore compelled, even though the width of the gap 6 is small, to close around the winding and not across the gap as shown on a larger scale in Fig. 4 which is a development of the stator periphery. The lines of force which would otherwise close over the path 9 would, to do this, also have to cross the air gaps 8 and consequently choose the path of less magnetic resistance around the winding as shown by the line of force 10.

By suitable arrangement of the air gaps in the segments 2 a further advantage can be achieved, namely equalisation of the magnetic resistances. By rotation of the rotor through 180° the path of the lines of force 11 would be too short with regard to the path of the lines of force 10 running around the windings. For this reason a deep recess is provided in the middle of each segment, i. e. a deep air gap 13, so that the lines of force do not follow the path 11 but a path 12 of length approximately equal to that of the path 10. In this way a practically constant magnetic flux is obtained and eddy current losses in the permanent magnet are avoided.

What I claim as my invention and desire to secure by Letters Patent is:

1. In an alternating current generator, a stator comprising a plurality of separate segments of equal size, and a housing, said segments being so shaped that when inserted in said housing the said segments frictionally interengage to form a cylindrical stator, each lateral edge of each segment being formed with a partial groove extending longitudinally of the axis of said generator, the groove formed between each pair of adjacent segments being adapted to receive a coil portion.

2. A generator according to claim 1 having a stator winding consisting of a closed coil extending in sinuous fashion through the said grooves in the said segments so that the direction of the current induced in said coil alternates in adjacent coil portions.

3. A generator according to claim 1, each said segment being so formed and dimensioned, inwardly of said groove portions, as to provide air gaps between adjacent segments and lying inwardly of said grooves.

4. A generator according to claim 1, each said segment being provided, between the said groove portions, with an air gap extending from the inner surface of said segment to a point beyond the outer peripheries of said groove portions.

5. In a process of manufacturing a generator, the steps of preparing a plurality of separate stator segments each having a partial groove extending longitudinally of the axis of the generator, the groove formed between each pair of adjacent segments being adapted to receive a coil portion, preparing a stator winding by making an annular coil of suitable circumference and then pressing said coil to form a closed zig-zag defining the surface of a cylinder, the parallel portions of said coil being adapted to be accommodated in the grooves formed between adjacent stator segments, assembling said stator segments about said coil, and introducing the assembled segments and coil into a housing.

BŘETISLAV HYBLER.

REFERENCES CITED

The following references are of record in the file of this patent:

UNITED STATES PATENTS

| Number | Name | Date |
| --- | --- | --- |
| 459,422 | Thomson | Sept. 15, 1891 |
| 680,597 | Joel | Aug. 13, 1901 |
| 1,255,607 | Hensley | Feb. 5, 1918 |
| 1,314,132 | Dorsey | Aug. 26, 1919 |
| 2,145,791 | Gille | Jan. 31, 1939 |
| 2,192,073 | Giskes | Feb. 27, 1940 |